United States Patent [19]

Ohtomo et al.

[11] Patent Number: 5,808,771

[45] Date of Patent: Sep. 15, 1998

[54] LASER ROTATING AND IRRADIATING SYSTEM

[75] Inventors: Fumio Ohtomo; Ken-ichiro Yoshino, both of Itabashi-ku, Japan

[73] Assignee: Kabushiki Kaisha Topcon, Tokyo-to, Japan

[21] Appl. No.: 584,434

[22] Filed: Jan. 11, 1996

[30] Foreign Application Priority Data

Jan. 11, 1995 [JP] Japan .................................. 7-018664

[51] Int. Cl.⁶ .................................................. G02B 26/08
[52] U.S. Cl. ...................... 359/196; 359/197; 359/211; 250/234; 250/235; 250/236
[58] Field of Search .................... 359/196–226; 347/225, 256–260; 250/234–236; 235/467, 470, 472; 358/474, 481

[56] References Cited

U.S. PATENT DOCUMENTS 3,823,313  7/1974  Unema ................................. 240/44.26
4,372,640  2/1983  LaCroix .
5,517,023  5/1996  Ohtomo et al. ........................ 250/234

Primary Examiner—James Phan
Attorney, Agent, or Firm—Foley & Lardner

[57] ABSTRACT

The present invention provides a laser rotating and irradiating system, having a main unit, which comprises a light emitting means, a scanning means for rotating a laser beam for scanning, a reflection light detecting means for detecting reflection light from an object reflector, an angle detecting means for detecting an angle of an irradiating direction of the laser beam, a scanning control unit for controlling a scanning range of the laser beam based on detection results of the angle detecting means and the reflection light detecting means, and a rotation control unit for driving a scanning motor within the scanning range.

13 Claims, 8 Drawing Sheets

LASER BEAM
SCANNING
DIRECTION

OUTPUT SIGNAL
OF DIFFERENTIAL
AMPLIFIER 34

LASER ROTATING AND IRRADIATING SYSTEM

BACKGROUND OF THE INVENTION

The present invention relates to a laser rotating and irradiating system for emitting a laser beam to scan and for forming a reference line or a reference plane.

In the field of civil engineering and architectural engineering, laser rotating and irradiating systems are increasingly used, which rotate a polarized irradiation light beam to scan within a horizontal plane or a vertical plane in order to determine a reference for height and a vertical position. For example, in indoor operation, a laser beam is used for marking on a wall. With this marking as the reference, a height of a window sash is determined. Or, laser beam is used for marking on a ceiling to determine the positions of fluorescent lamps.

In recent years, a visible semiconductor laser has been increasingly used in practical application, and a laser rotating and irradiating system using the visible semiconductor laser is also used to facilitate visual operation. In such a laser rotating and irradiating system, laser output is limited for the safety of the workers. For this reason, the working distance is relatively short during the working operation or the measuring operation, which requires visual confirmation of reflection of the polarized irradiation light beam.

In this respect, as shown in FIG. 10, a laser rotating and irradiating system has been developed and used for practical application, which reciprocally rotates a polarized irradiation light beam for reciprocal scanning, increases apparent luminance of the polarized reflection light beam and enables a longer working distance. For reciprocally scanning within an adequate range, it is necessary to identify scanning positions. For this purpose, a laser rotating and irradiating system is provided, in which an object reflector 2 is arranged on a working point such as wall surface 8 and the position of the object reflector is identified by detecting the polarized reflection light beam from the object reflector 2. In this laser rotating and irradiating system, a main unit 1 comprises a rotating unit 4, which emits a laser beam. By rotating the rotating unit 4, the laser beam scans in the total peripheral direction. At a position where the polarized reflection light beam is detected, the rotating unit 4 is reciprocally rotated, and reciprocal scanning of the laser beam is performed around the object reflector 2 within a given range.

In such a laser rotating and irradiating system, in order to perfectly identify the object reflector, polarized light is used as the outgoing light, and the polarized light reflected from the object reflector has a different direction of polarization from that of the outgoing light. This is to discriminate from an undesired reflector such as a glass surface, which reflects the light while maintaining the direction of polarization.

In the laser rotating and irradiating system as described above, the object reflector is detected and reciprocal scanning is performed within a preset range required. Thus, the range for reciprocal scanning is fixed. When the object reflector is removed, the reciprocal scanning for the preset range cannot be performed, and scanning is then performed in the total peripheral direction. For this reason, in a conventional type laser rotating and irradiating system, it is necessary to bring the object reflector to a position where a marking should be made. Further, when a marking line such as a horizontal line is drawn within a given range, it is necessary to bring the object reflector to two different positions and marking must be made at each position. When marking must be made on a ceiling, a ladder must be used, and this causes further inconvenience in the work.

SUMMARY OF THE INVENTION

It is an object of the present invention to provide a system, by which it is possible to easily change the range of reciprocal scanning of a laser beam, to maintain the condition of the reciprocal scanning even when an object reflector is removed, and to simplify working operation such as reference position marking, marking line drawing, etc. It is another object of the present invention to provide a laser rotating and irradiating system, by which it is possible to reliably discriminate the object reflector from an undesired reflector and to detect the object reflector in a more reliable manner.

To attain the above objects, the laser rotating and irradiating system of the present invention has a main unit, which comprises a light emitting means, a scanning means for rotating a laser beam for scanning, a reflection light detecting means for detecting reflection light from an object reflector, an angle detecting means for detecting an angle of an irradiating direction of the laser beam, a scanning control unit for controlling a scanning range of the laser beam based on the detection results of the angle detecting means and the reflection light detecting means, and a rotation control unit for driving a scanning motor within the scanning range, whereby the scanning control unit comprises a calculating means for calculating a scanning range based on the detection results of the angle detecting means and the reflection light detecting means, and a memory means for memorizing the scanning range, further, when a first direction of the object reflector is detected and memorized and the object reflector is detected and memorized in a second direction, reciprocal scanning is performed from the first direction to the second direction, and when a given period of time has elapsed for the detection of the object reflector, the direction of the object reflector is memorized and the scanning range can be varied, and after a given time has elapsed for detection of the object reflector, if the scanning range has been set by the object reflector and the object reflector is removed, the scanning range is memorized by the scanning control unit, and the memory of the scanning range is cancelled when the reflection light detecting means detects the object reflector again after the scanning range has been memorized. Further, the laser beam irradiated from the main unit is a polarized light beam, and the main unit comprises a first detecting means for detecting a polarized reflection light beam from the object reflector, a second detecting means for detecting a Polarized light beam from the object reflector different from the polarized reflection light beam, and a reflection light beam detection circuit for identifying the object reflector from the comparison between output of the first detecting means and output of the second detecting means, whereby a reflecting surface of the object reflector has two reflecting portions, and at least two reflecting portions of the object reflector are polarized light maintained reflecting portions or polarized light converted reflecting portions, at least one reflecting portion is a polarized light maintained reflecting portion to reflect a polarized reflection light beam maintaining the same direction of polarization as that of the polarized irradiation light beam, at least one reflecting portion is a polarized light converted reflecting portion to reflect a polarized reflection light beam having a direction of polarization converted from that of the polarized irradiation light beam, and, of the reflecting portions of the object reflector, at least one reflecting portion is a polarized light maintained reflecting portion comprising only a reflecting layer and for reflecting a polarized reflection light beam, maintaining the same direction of polarization as that of the polarized irradiation light beam, and at least one reflecting portion is a polarized light converted reflecting portion comprising a birefringence layer and a reflecting layer and for reflecting the polarized reflection light beam having its direction of polarization converted from that of the polarized irradiation light beam, and the boundary between the polarized light converted reflecting portion and the polarized light maintained reflecting portion is identified by the reflecting light beam from the object reflector, and the reflecting portions of the object reflector is formed on a substrate, the exposed portion thereof is formed adjacently to the reflecting portions.

DETAILED DESCRIPTION OF THE PREFERRED EMBODIMENT

In the following, description will be given on an embodiment of the present invention in connection with the drawings.

Figure 1:
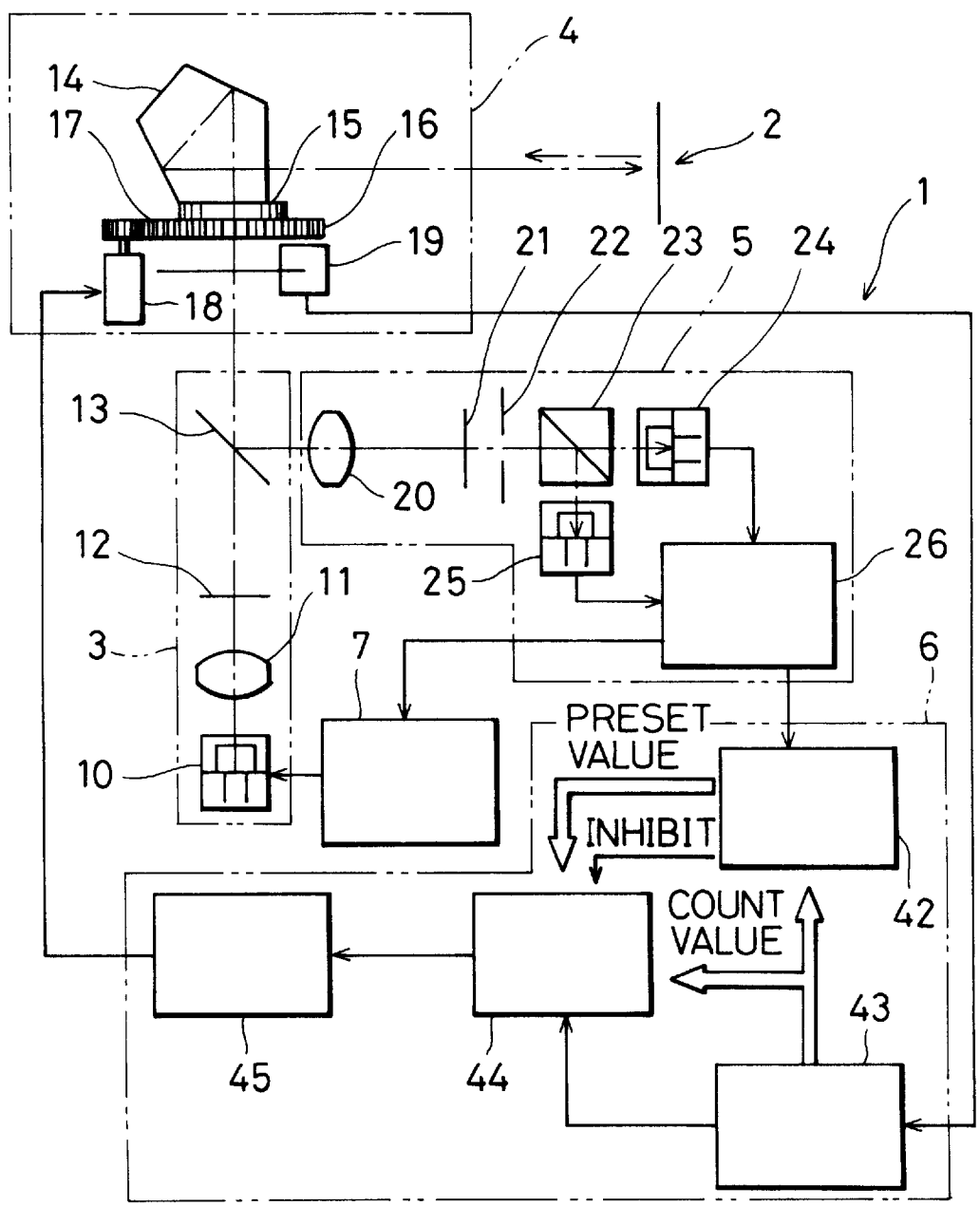
FIG. 1 is a block diagram of an embodiment of the present invention.

FIG. 1 represents a laser rotating and irradiating system according to the present invention, which comprises a main unit 1 and an object reflector 2 separately positioned from the main unit 1 of the laser rotating and irradiating system.

First, the main unit 1 of the laser rotating and irradiating system will be described.

The main unit 1 of the laser rotating and irradiating system comprises a light emitting unit 3, a rotating unit 4, a reflection light detecting unit 5, a scanning control unit 6, and a light emitting element drive unit 7.

First, the light emitting unit 3 will be described.

On an optical axis of a laser diode 10, which emits a linearly polarized irradiation light beam, a collimator lens 11, a first $\lambda/4$ birefringence member 12, and a perforated mirror 13 are arranged in this order as seen from the laser diode 10. The linearly polarized irradiation light beam emitted from the laser diode 10 is turned to parallel beams through the collimator lens 11 and is converted to a circularly polarized light through the first $\lambda/4$ birefringence member 12. The circularly polarized irradiation light beam passes through the perforated mirror 13 and is irradiated to the rotating unit 4.

The rotating unit 4 irradiates the polarized irradiation light beam, coming from the emitting unit 3, in a horizontal direction for scanning. A pentagonal prism 14 is arranged on a rotation support 15, which is rotated around the optical axis of the polarized irradiation light beam, and deflects the optical axis of the polarized irradiation light beam, coming from the light emitting unit 3, at an angle of 90°. The rotation support 15 is connected to a scanning motor 18 via a driven gear 16 and a driving gear 17. The rotation of the rotation support 15 is detected by an encoder 19, and a detection signal of the encoder 19 is inputted to the scanning control unit 6.

A polarized reflection light beam from the object reflector 2 enters the rotating unit 4. After entering the pentagonal prism 14, the polarized reflection light beam is deflected toward the perforated mirror 13, which directs the polarized reflection light beam toward the reflection light detecting unit 5.

Next, description will be given on the reflection light detecting unit 5.

On the optical axis of the reflection light coming from the perforated mirror 13, a condenser lens 20, a second $\lambda/4$ birefringence member 21, a pin hole 22, a polarized light beam splitter 23, and a first photodetector 24 comprising a photodiode and like are arranged in this order as seen from the perforated mirror 13. On the optical axis of the reflection light from the polarized light beam splitter 23, a second photodetector 25 comprising a photodiode and the like is arranged. The outputs from the first photodetector 24 and the second photodetector 25 are inputted to the reflection light beam detection circuit 26.

The polarized light beam splitter 23 splits the polarized reflection light beam, which enters the reflection light detecting unit 5, and directs the light beams toward the first photodetector 24 and the second photodetector 25. The second $\lambda/4$ birefringence member 21 and the polarized light beam splitter 23 are arranged in such manner that the light beam, having the same direction of polarization as that of the reflection light beam being emitted from the light emitting unit 3 and returning to the main unit after passing through the $\lambda/4$ birefringence member twice, enters the first photodetector 24, and that the polarized reflection light beam, returning to the main unit and having the same direction of polarization as that of the polarized irradiation light beam emitted from the light emitting unit 3, enters the second photodetector 25.

Figure 2:
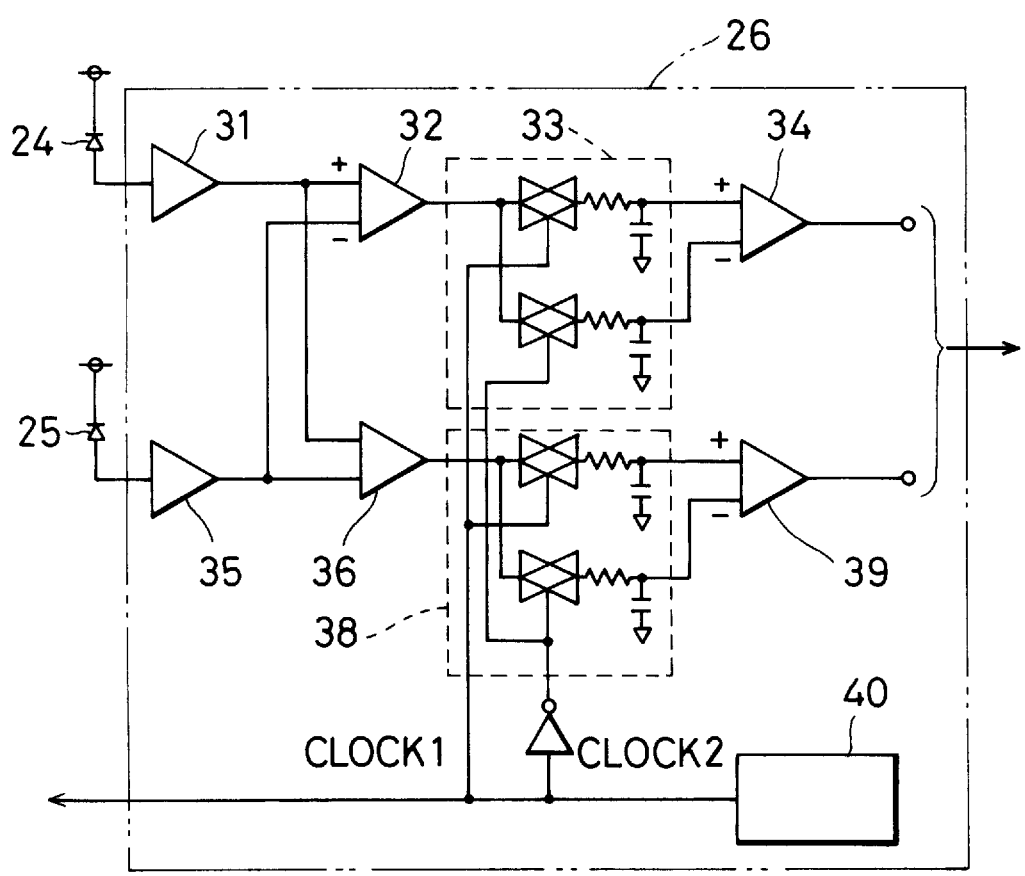
FIG. 2 is a block diagram of a reflection light beam detection circuit in the above embodiment.

Description will be given now on an example of the reflection light beam detection circuit 26, referring to FIG. 2.

The outputs of the first photodetector 24 and the second photodetector 25 are inputted to a differential amplifier 32 via amplifiers 31 and 35, and the output of the differential amplifier 32 is inputted to a differential amplifier 34 via a synchronous detector 33. The outputs of the first photodetector 24 and the second photodetector 25 are inputted to a summing amplifier 36 via the amplifiers 31 and 35, and the output of the summing amplifier 36 is inputted to a differential amplifier 39 via a synchronous detector 38. The outputs of the differential amplifiers 39 and 34 are inputted to the scanning control unit 6.

The reflection light beam detection circuit 26 is provided with an oscillator circuit 40. The oscillator circuit 40 outputs a clock signal for synchronous detection to the synchronous detectors 33 and 38 and also issues a clock signal necessary for pulse modulation to the light emitting element drive unit 7. The light emitting element drive unit 7 performs pulse modulation of the polarized irradiation light beam emitted from the laser diode 10 based on the clock signal from the reflection light beam detection circuit 26.

The scanning control unit 6 comprises a CPU 42, an angle detector 43, a rotating direction control unit 44, and a rotation control unit 45. The signal from the encoder 19 is inputted to the angle detector 43, and the signal from the reflection light beam detection circuit 26 is inputted to the CPU 42.

The angle detector 43 counts the signal from the encoder 19 and so on, detects an angle of the emitting direction of the polarized irradiation light beam, and the detected angle signal is outputted to the CPU 42 and to the rotating direction control unit 44. The CPU 42 identifies the object reflector 2 by the signal from the reflection light beam detection circuit 26 and judges its direction by the signal from the angle detector 43. In the CPU 42, an angular width of reciprocal scanning with respect to an object point, i.e. the object reflector 2, can be set from an external input means (not shown). From the angular width, inversion positions α and β (to be described later) are calculated, and the inversion position signal is inputted to the rotating direction control unit 44. The rotating direction control unit 44 calculates an inversion signal based on the signals from the CPU 42 and the angle detector 43, and the inversion signal is outputted to the rotation control unit 45. The rotation control unit 45 controls the rotation of a scanning motor 18 based on the inversion signal, and reciprocal scanning of the polarized irradiation light beam coming from the rotating unit 4 is performed within a small range.

Figure 3:
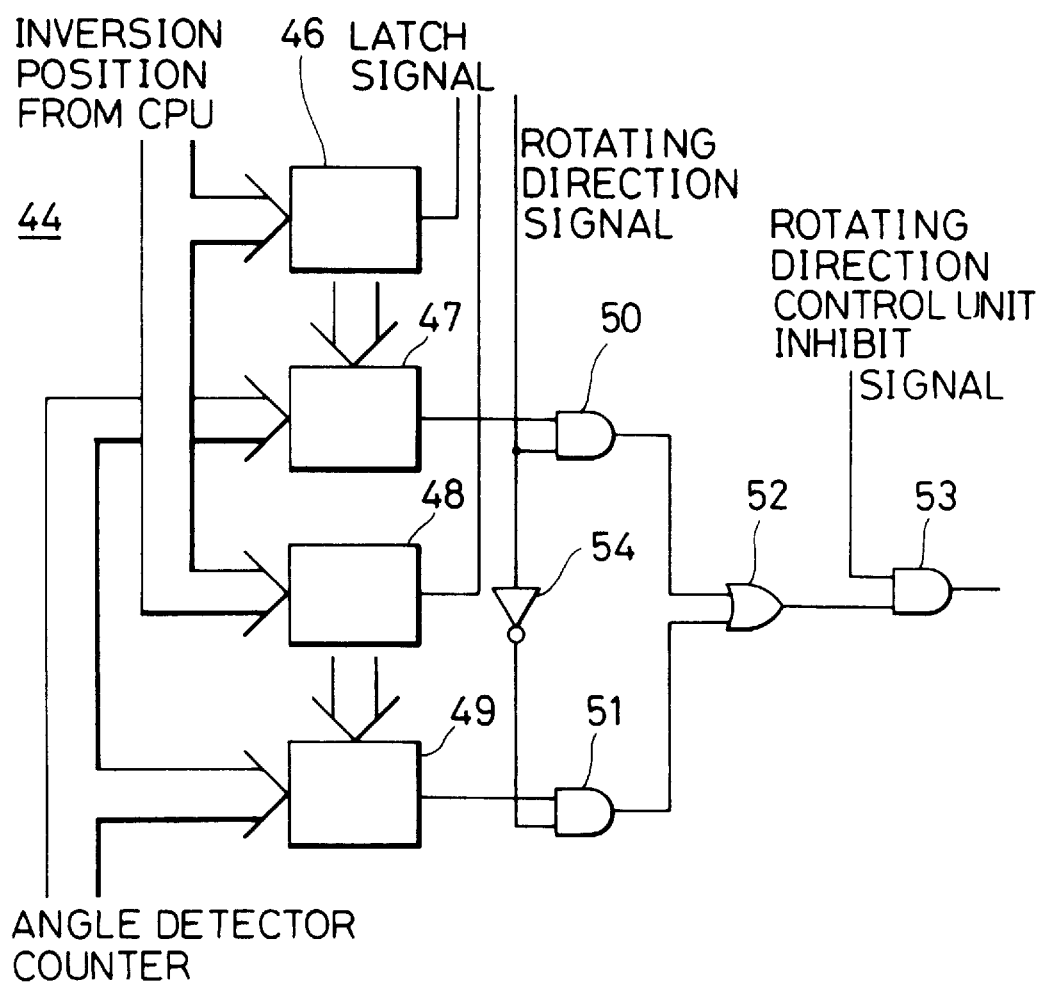
FIG. 3 is a block diagram of a rotating direction control unit of the above embodiment.

The configuration of the rotating direction control unit 44 is as shown in FIG. 3, and it comprises digital comparators 47 and 49, latches 46 and 48, AND gates 50, 51 and 53, an OR gate 52, and an inverter 54.

To the digital comparators 47 and 49, the inversion position signal from the CPU 42 is inputted via the latches 46 and 48, and latch signals from the CPU 42 are inputted to the latches 46 and 48. To the digital comparators 47 and 49, an angle signal from the angle detector 43 is inputted. The signals from the digital comparators 47 and 49 are inputted to the OR gate 52 via the AND gates 50 and 51, and a rotating direction signal from the angle detector 43 is inputted to the AND gate 50, and a rotating direction signal from the angle detector 43 is inverted by an inverter 54 and is inputted to the AND gate 51. An output from the OR gate 52 and a rotating direction control unit inhibit signal from the CPU 42 are inputted to the AND gate 53, and an output from the AND gate 53 is inputted to the rotation control unit 45.

Figure 5:
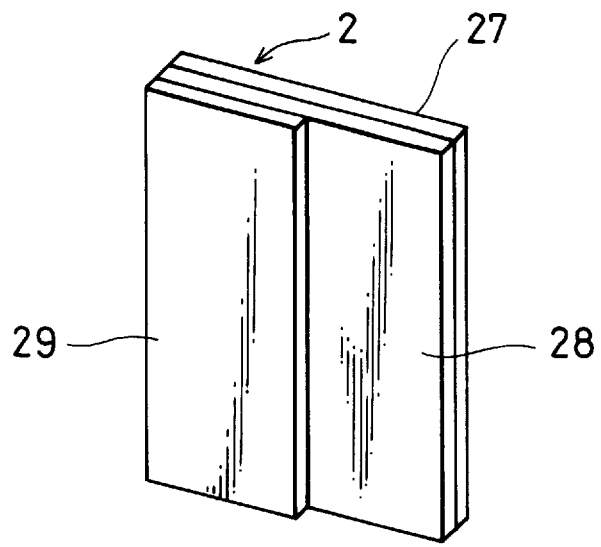
FIG. 5 is a perspective view of an object reflector.

Next, description will be given on the object reflector 2 referring to FIG. 5.

A reflecting layer 28 is formed on a substrate 27. On the left portion thereof (in the figure), a λ/4 birefringence member 29 is attached. The exposed portion of the reflecting layer 28 serves as a polarized light maintained reflecting portion, which reflects an incident light beam while maintaining its direction of polarization, and the portion of the λ/4 birefringence member 29 serves as a polarized light converted reflecting portion, which converts the direction of polarization with respect to the incident light beam and reflects it. The reflecting layer 28 is made of a retroreflection material, where a plurality of very small corner cubes or spherical reflectors, etc. are arranged. The λ/4 birefringence member 29 exerts such an action that the polarized reflection light beam causes a phase difference of λ/4 with respect to the incident light beam.

In the following, description will be given on the operation. First, the detection of the object reflector 2 is described.

The polarized irradiation light beam emitted from the laser diode 10, which is driven by the light emitting element drive unit 7, is modulated based on a clock signal from the oscillator circuit 40. The linearly polarized irradiation light beam emitted from the laser diode 10 is turned to parallel beams through the collimator lens 11 and is further turned to a circularly polarized irradiation light beam after passing through the first λ/4 birefringence member 12. The circularly polarized irradiation light beam passes through the perforated mirror 13 and is deflected toward the horizontal direction by the pentagonal prism 14 and is irradiated.

The pentagonal prism 14 is rotated by the scanning motor 18 via a driving gear 17 and a driven gear 16. The rotating range of the pentagonal prism 14 initially covers the total peripheral direction, and the polarized irradiation light beam irradiated through the pentagonal prism 14 scans in the total peripheral direction.

By scanning in total peripheral direction, the polarized irradiation light beam passes through the object reflector 2. While passing through the object reflector, the polarized irradiation light beam is reflected by the object reflector 2, and the polarized reflection light beam enters the pentagonal prism 14.

As described above, one-half of the object reflector 2 serves as the reflecting layer 28, and the λ/4 birefringence member 29 is attached on the other half. Therefore, the polarized reflection light beam reflected by the exposed portion of the reflecting layer 28 is a circularly polarized light, in which the polarizing condition of the incident polarized irradiation light beam is maintained. The polarized reflection light beam, which passed through the λ/4 birefringence member 29, reflected by the reflecting layer 28 and further passing through the λ/4 birefringence member 29, is a circularly polarized light deviated by λ/2 phase from the polarizing condition of the incident polarized irradiation light beam.

The polarized reflection light beam reflected by the object reflector 2 is deflected at an angle of 90° by the pentagonal prism 14 and enters the perforated mirror 13, and the perforated mirror 13 reflects the reflection light beam toward the condenser lens 20. The condenser lens 20 directs the reflection light beam toward the second λ/4 birefringence member 21 as a convergent light. The reflection light beam returned as the circularly polarized light is converted to a linearly polarized light by the second λ/4 birefringence member 21 and enters the pin hole 22. As already described, the reflection light beam reflected by the exposed portion of the reflecting layer 28 is deviated by λ/2 in phase from the reflection light beam reflected by the λ/4 birefringence member 29. As a result, the two reflection light beams converted to linearly polarized light by the second λ/4 birefringence member 21 are deviated by 90° from each other in planes of polarization.

The pin hole 22 fulfills such a function that the reflection light beam having its optical axis deviated with respect to the polarized irradiation light beam emitted from the main unit does not enter the photodetectors 24 and 25, and the reflection light beam enters the polarized light beam splitter 23 after passing through the pin hole 22.

The polarized light beam splitter 23 fulfills such a function that it allows a light beam to pass, which has a direction of polarization deviated by 180° from that of the polarized irradiation light beam emitted from the light emitting unit 3 and reflects a light beam, which has a direction of polarization deviated by 90° from that of the direction of polarization of the polarized irradiation light beam emitted from the light emitting unit 3. When passing through the polarized light beam splitter 23, the reflection light beam is split to polarized components, crossing perpendicularly to each other, by the polarized light beam splitter 23, and the photodetectors 24 and 25 receive the split reflection light beams respectively.

The photodetecting conditions of the first photodetector 24 and the second photodetector 25 are as follows: When the polarized reflection light beam passing through the λ/4 birefringence member twice outside the main unit, i.e. the polarized reflection light beam reflected by the λ/4 birefringence member 29 of the object reflector 2, enters the reflection light detecting unit 5, the light quantity entering the first photodetector 24 is higher than the light quantity entering the second photodetector 25 because of the relationship between the second λ/4 birefringence member 21 and the polarized light beam splitter 23. Also, when the polarized reflection light beam not passing through the λ/4 birefringence member, i.e. the polarized reflection light beam reflected by the exposed portion of the reflecting layer 28 of the object reflector 2 or by the other undesired reflector, enters, the light quantity entering the second photodetector 25 is higher than the light quantity entering the first photodetector 24.

By finding out the difference of the incident light quantity between the polarized reflection light beam directed to the first photodetector 24 and the light beam directed to the second photodetector 25, it is possible to identify whether the incident polarized reflection light beam has been reflected by the exposed portion of the reflecting layer 28 of the object reflector 2 or whether it has been reflected by the λ/4 birefringence member 29.

Figure 4:
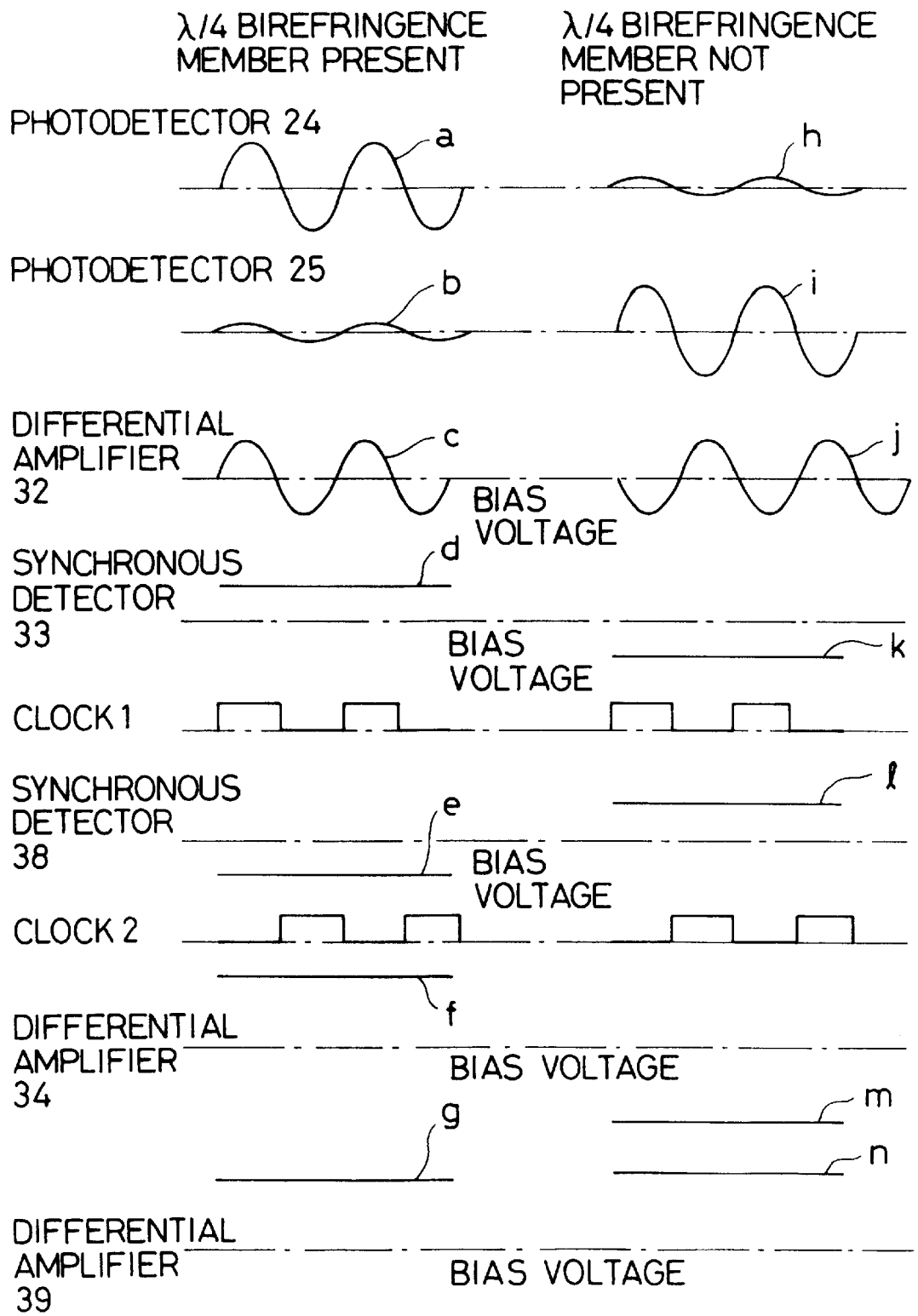
FIG. 4 represents diagrams showing signal waveforms in a reflection light beam detection circuit.

Further, detailed description will be given in connection with FIG. 4.

In the case of the reflection light beam, which has passed through the λ/4 birefringence member 29 twice, the light quantity entering the first photodetector 24 of the reflection light detecting unit 5 is higher than the light quantity entering the second photodetector 25. The signals are shown in FIG. 4 as a and b. The signals from each of the photodetectors 24 and 25 are amplified by the amplifiers 31 and 35, and the difference is obtained by the differential amplifier 32. This signal is shown as c in FIG. 4. When synchronous detection of the output signal of the differential amplifier 32 is performed at a clock 1 from the oscillator circuit 40, positive voltage (shown as d in FIG. 4) with respect to bias voltage is obtained. If synchronous detection is performed at a clock 2, negative voltage (shown as e in FIG. 4) with respect to bias voltage is obtained. By finding out the difference of voltage obtained by synchronous detection (d–e), output of the differential amplifier 34 is obtained as positive voltage (shown as f in FIG. 4) with respect to bias voltage.

In the case of the reflection light beam not passing through the λ/4 birefringence member 29, the light quantity entering the second photodetector 25 of the reflection light detecting unit is higher than the light quantity entering the first photodetector 24. These signals are shown as h and i in FIG. 4. The signals from the photodetectors 24 and 25 are amplified by the amplifiers 31 and 35, and the difference is obtained by the differential amplifier 32. This signal is shown as j in FIG. 4. When synchronous detection of the output signal of the differential amplifier 32 is performed at the clock 1 from the oscillator circuit 40, negative voltage (shown as k in FIG. 4) with respect to bias voltage is obtained, and if synchronous detection is performed at the clock 2, positive voltage (shown as l in FIG. 4) is obtained. By finding out the difference of voltage obtained by the synchronous detection (k–l), the output of the differential amplifier 34 is obtained as negative voltage (shown as m in FIG. 4) with respect to bias voltage.

Figure 6A:
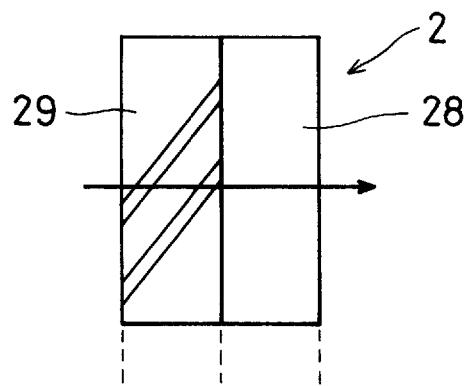
FIG. 6A represents a relationship between the object reflector and the polarized light irradiation light beam.
Figure 6B:
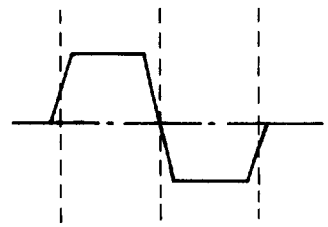
FIG. 6B represents a relationship between the object reflector and output signal from the object reflector.

As shown in FIG. 6A, when the object reflector 2 is scanned by the polarized irradiation light beam, the output of the differential amplifier 34 in the reflection light beam detection circuit 26 has a waveform as shown in FIG. 6B. When a positive signal is obtained as the output of a the differential amplifier 34, fall-down (trailing) of negative signal occurs within a given time from fall-down of the positive signal, and it is identified as the object reflector 2. When the object reflector 2 has been identified, the scanning motor 18 is driven by the scanning control unit 6. The pentagonal prism 14 is reciprocally rotated, and reciprocal scanning of the polarized irradiation light beam emitted from the main unit 1 of the laser rotating and irradiation system is performed on and around the object reflector 2. When the object reflector 2 is used, when rotating the direction of the polarized irradiation light beam is reversed, the sign (+ or –) of the output signal of the differential amplifier 34 of the reflection light beam detection circuit 26 is reversed.

When the polarized irradiation light beam emitted from the main unit 1 of the laser rotating and irradiating system is reflected once by a mirror , etc. and enters the object reflector 2 and is reflected, the order of the sign (+ or –) of the output signal of the differential amplifier 34 is reversed from the rotating direction of the polarized irradiation light beam when the reflection light beam is received. Accordingly, it is possible to identify whether it is the reflection light beam reflected once by an object other than the object reflector 2 and returned after reflected by the object reflector 2, or it is the reflection light beam reflected by an object other than the object reflector 2.

Figure 8:
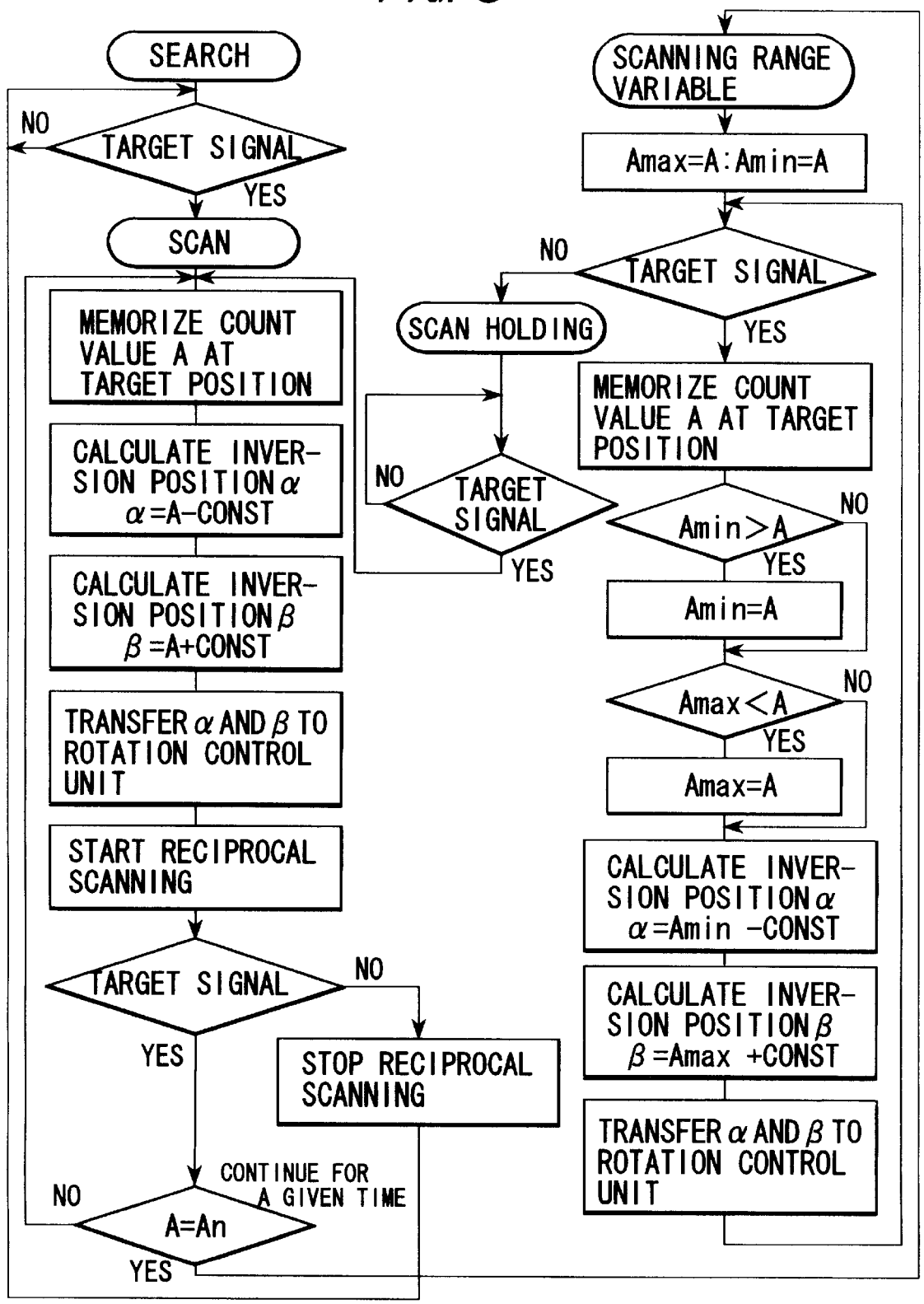
FIG. 8 is a flow chart showing operation of an embodiment of the present invention.
Figure 9:
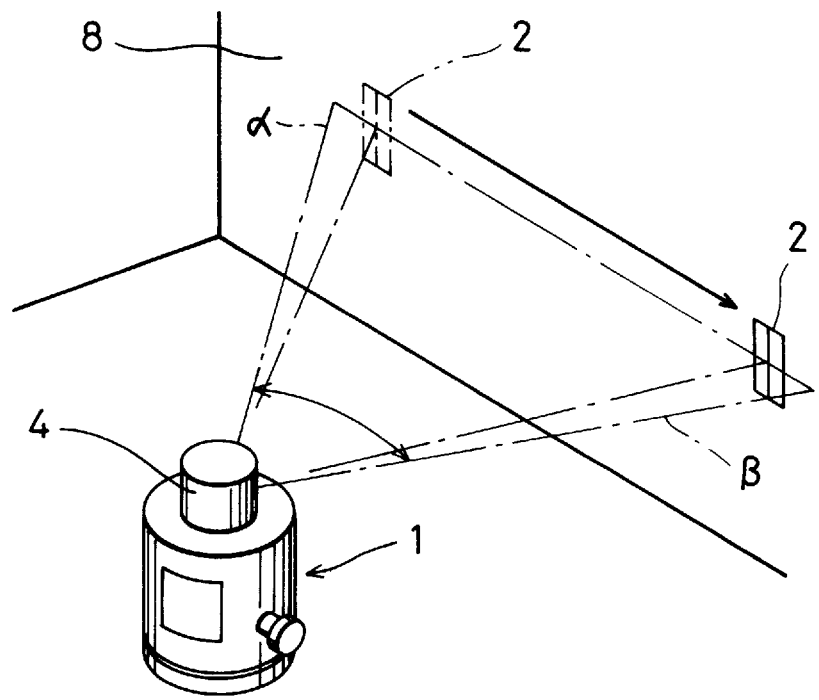
FIG. 9 is a drawing for explaining operation of an embodiment of the present invention.
Figure 10:
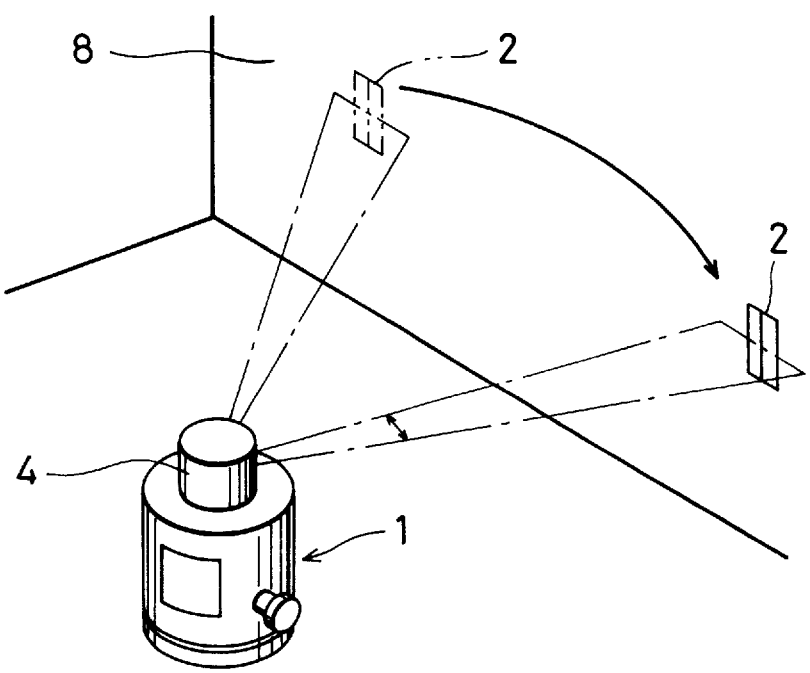
FIG. 10 is a drawing for explaining operation of a conventional type system.

Next, description will be given the scanning operation of the polarized irradiation light beam in the above embodiment, referring to FIGS. 8 and 9.

When the system is started, scanning is performed in total peripheral direction by the laser beam at a constant speed, and it is turned to the searching mode. When the object reflector 2 is identified by the procedure as described above in the searching mode, an angle (count value A) in a position direction of the object reflector 2 is obtained by the angle detector 43. To the count value A, reciprocal scanning is performed for a given width, i.e. for a distance between inversion position α and inversion position β. The period of this reciprocal scanning is assumed as 10 c/s, for example.

A predetermined reciprocal scanning width (angular width) is inputted in advance in the CPU 42. The inversion position α where the scanning direction is turned to the clockwise direction is calculated by subtracting a constant value (the above angular width) with respect to the count value A, and the inversion position B where the rotating direction is inverted to the counterclockwise direction, is calculated by adding a constant value with respect to the count value A.

The inversion positions α and β as calculated by the CPU 42 are inputted to the rotating direction control unit 44 as comparative reference values.

The inversion position α is memorized by the latch 46, and the inversion position β where the rotating direction is inverted to the counterclockwise direction is memorized by the latch 48. The digital comparator 47 compares the count value of the encoder of the angle detector 43 with the inversion position α memorized at the latch 46. When the laser beam is rotated counterclockwise and the count value of the encoder 19 becomes equal to the value memorized at the latch 46, a signal is outputted from the digital comparator 47, and the rotating direction is reversed. Before the rotating direction is reversed and rotating is started in the clockwise direction, it already goes beyond the inversion position memorized at the latch 46, and a signal is issued from the digital comparator 47 again. However, the rotating direction is not reversed because the signal from the digital comparator 47 while the scanning of the laser beam rotated clockwise is inhibited by the AND gate 50. Similarly, when the digital comparator 49 compares the count value of the encoder of the angle detector 43 with the inversion position β memorized at the latch 48 and finds the former as being equal to the latter, a signal is issued, and the AND gate 51 inhibits the signal issued again immediately after the inversion, and the laser beam is inverted to the counterclockwise direction. When either one of the AND gates 50 or 51 issues the signal, the OR gate 52 sends a signal to the AND gate 53. In the searching mode where there is no need to reverse the rotating direction, the AND gate 53 inhibits by the CPU 42 in such manner that the inversion signal is not issued from the rotating direction control unit 44.

The inversion signal is issued to the rotating control unit 45 from the rotating direction control unit 44, and the rotating control unit 45 controls the rotating direction of the scanning motor 18 and reciprocal scanning is performed between the inversion positions α and β. When there is no more signal from the object reflector 2 during reciprocal scanning, the rotating direction control unit 44 is inhibited, and it is turned to the searching mode. The direction where the object reflector 2 is present is detected in the count value A by the angle detector 43. When the count value A does not change for a given time, it is turned to a scanning range variable mode with the count value A as the starting point.

In the scanning range variable mode, when the object reflector 2 is moved along the scanning line from the starting point, the scanning range is determined with the starting point as one end and with the position of the moved object reflector as the other end. That is, the other end of the scanning range moves with the object reflector 2. As described above, the period of the reciprocal scanning is about 10 c/s, and it can be amply followed. When it is turned to the scanning range variable mode, the overrun width (reciprocal scanning width) with respect to the reference point may be widened.

At the starting point and at the position of the moved object reflector 2, the maximum value (Amax) and the minimum value (Amin) of the count value A of the angle detector 43 are memorized. By adding a constant value to the maximum value Amax or by subtracting a constant value from the minimum value Amin and by transferring the results of calculation to the rotation control unit 44, it is possible to widen the scanning ends and to vary the scanning range by the extent of movement of the object reflector 2 in the moving direction.

When the object reflector 2 is removed from the scanning position of the laser beam and the polarized reflection light signal does not come back to the main unit 1 of the laser rotating and irradiating system, the inversion position is maintained, and it is turned to the scanning holding mode where reciprocal scanning is continued. In the scanning holding mode, if the signal from the object reflector 2 is obtained again, a constant value is added to or subtracted from the count value A in the direction where the object reflector 2 is present in order to calculate the inversion position so that reciprocal scanning is performed on and around the object reflector even when the object reflector moves.

The constant value used in the calculation of the above inversion position may be varied according to the distance so that reciprocal scanning of the polarized irradiation light beam can be performed beyond the width of the object reflector by the photodetection signal of the polarized reflection light beam from the object reflector.

To cancel the scanning holding mode, the object reflector 2 is again arranged along the scanning line, and it is adjusted in such a manner that the reflected laser beam from the object reflector 2 returns to the main unit 1 of the laser rotating and irradiating system. When the main unit 1 of the laser rotating and irradiating system detects the reflected laser beam, it is turned to the reciprocal scanning mode on and around the object reflector 2, and when the object reflector 2 is removed within a given time as described above, it is returned to the searching mode in the total peripheral direction.

As explained above, by holding the object reflector 2 for a certain period of time, the scanning position is memorized. When the object reflector 2 is moved after it has been held for a certain period of time, the scanning width can be maintained to the desired width, and the scanning condition can be maintained even after the object reflector 2 has been removed. Because the scanning condition is maintained after the object reflector 2 has been removed, it is possible to determine the scanning range while maintaining the object reflector near the main unit 1 of the laser rotating and irradiation system and without setting up the object reflector 2 near an object such as ceiling where the laser beam is irradiated. It is also possible to eliminate complicated marking operation at an inconvenient place.

Next, further examples of the object reflector 2 are shown in FIGS. 7A–FIG. 7E respectively.

Reflecting portions 28, 29 are partially formed on a substrate 27, the exposed portion thereof is formed adjacently to the reflecting portions.

Figure 7A:
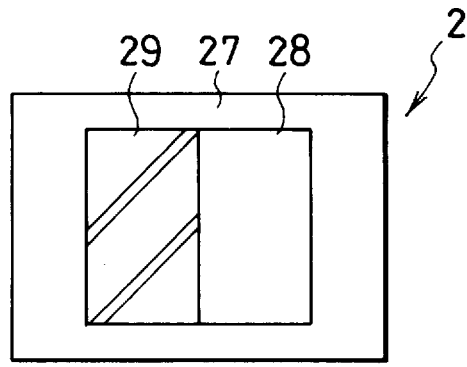
FIGS. 7A, 7B, 7C, 7D, and FIG. 7E each shows another example of an object reflector.
Figure 7B:
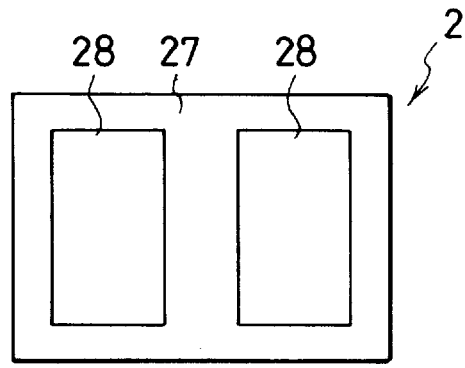
Figure 7C:
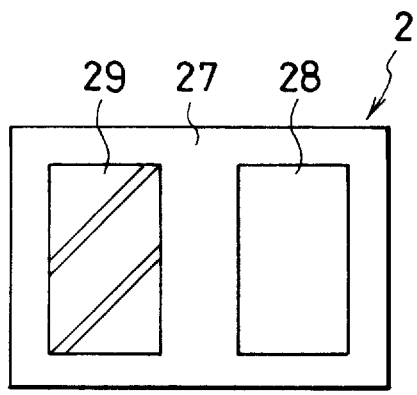
Figure 7D:
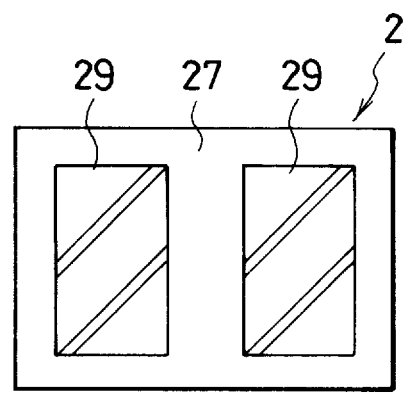
Figure 7E:
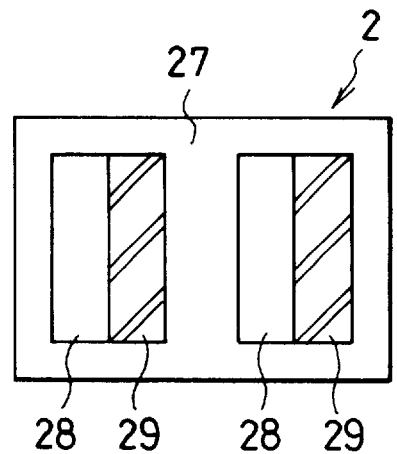

In FIG. 7A, an object reflector 2 comprises a polarized light maintained reflecting portion 28 and a polarized light converted reflecting Portion 29, which are adjacent to each other. In FIG. 7B, an object reflector 2 comprises two reflecting portions, both of which are polarized light maintained reflecting portions 28, 28 and are separated from each other. In FIG. 7C, an object reflector 2 comprises a polarized light maintained reflecting portion 28 and a polarized light converted reflecting portion 29, which are formed separately from each other on the object reflector 2. In FIG. 7D, an object reflector 2 comprises two separated reflecting portions, both of which are polarized light converted reflecting portions 29, 29. Further, in FIG. 7E, an object reflector 2 comprises two combinations of a polarized light maintained reflecting portion 28 and a polarized light converted reflecting portion 29, the two combinations of reflecting portions are formed separately on the object reflector 2.

As described above, it is possible according to the present invention to perform reciprocal scanning of the laser beam within the desired range, to eliminate marking operations such as marking line drawing. There is no need to hold the object reflector on an object surface where the laser beam is irradiated. Thus, working efficiency is extensively increased, the object reflector can be detected in a reliable manner, and the reliability of the system is improved.

What we claim are:

1. A laser rotating and irradiating system, comprising:
   a main unit having a light emitting means for emitting light, a scanning means for rotating a laser beam for scanning, a reflection light detecting means for detecting reflection light from an object reflector, an angle detecting means for detecting an angle of an irradiating direction of the laser beam, a control unit for controlling a scanning range of the laser beam based on detection results of said angle detecting means and said reflection light detecting means, and a rotation control unit for driving a scanning motor within said scanning range.

2. A laser rotating and irradiating system according to claim 1, wherein said control unit comprises a calculating means for calculating the scanning range based on detection results of said angle detecting means and said reflection light detecting means, and a memory means for memorizing the scanning range.

3. A laser rotating and irradiating system according to claim 2, wherein the object reflector is moveable and the laser rotating and irradiating system further comprises a unit for detection of the object reflector and wherein, when a first direction of said object reflector is detected and memorized in said memory means and thereafter the object reflector is detected and memorized in said memory means as being at a second direction, reciprocal scanning is performed from said first direction as a starting point to said second direction.

4. A laser rotating and irradiating system according to claim 2, wherein the object reflector is moveable and the laser rotating and irradiating system further comprises a unit for detection of the object reflector and wherein the direction of the object reflector is memorized in said memory means when the time for detection of the object reflector exceeds a given period of time, and wherein the scanning range can be varied.

5. A laser rotating and irradiating system according to claim 1, further comprising a unit for detection of the object reflector and wherein, after a given time has elapsed for detection of the object reflector, the scanning range is set by the object reflector, and when the object reflector is then removed, the scanning range is memorized by said control unit.

6. A laser rotating and irradiating system according to claim 5, wherein, after the scanning range has been memorized, the memory of the scanning range is cancelled when the object reflector is detected again.

7. A laser rotating and irradiating system according to claim 1, wherein the laser beam irradiated from the main unit is a polarized light beam, said main unit comprises a first detecting means for detecting a polarized reflection light beam from a first reflecting portion of the object reflector, a second detecting means for detecting a polarized reflection light beam from a second reflecting portion of the object reflector different in polarization from said polarized reflection light beam from the first reflecting portion of the object reflector, and a reflection light beam detection circuit for identifying the object reflector from comparison between output of the first detecting means and output of the second detecting means.

8. A laser rotating and irradiating system according to claim 7, wherein said first reflecting portion of the object reflector maintains polarization of said light beam and said second reflecting portion converts polarization of said light beam.

9. A laser rotating and irradiating system according to claim 7, wherein said first reflecting portion of the object reflector is a polarized light maintained reflecting portion to reflect a polarized reflection light beam maintaining the same direction of polarization as that of the polarized irradiation light beam, and said second reflecting portion is a polarized light converted reflecting portion to reflect a polarized reflection light beam having a direction of polarization converted from that of the polarized irradiation light beam.

10. A laser rotating and irradiating system according to claim 9, wherein a boundary between the polarized light converted reflecting portion and the polarized light maintained reflecting portion is identified by the reflecting light beam from the object reflector.

11. A laser rotating and irradiating system according to claim 7, wherein said first reflecting portion is a polarized light maintained reflecting portion comprising only a reflecting layer for reflecting a polarized reflection light beam, maintaining the same direction of polarization as that of the polarized irradiation light beam, and said second reflecting portion is a polarized light converted reflecting portion, comprising a birefringence layer and a reflecting layer for reflecting a polarized reflection light beam having its direction of polarization converted from that of the polarized irradiation light beam.

12. A laser rotating and irradiating system according to claim 7, wherein the reflecting portions of the object reflector are formed on a substrate.

13. A laser rotating and irradiating system according to claim 7, wherein said object reflector has two pairs of said first reflecting portion and said second reflecting portion.

* * * * *